United States Patent
Staley et al.

[11] Patent Number: 6,145,909
[45] Date of Patent: Nov. 14, 2000

[54] AUTOMOTIVE VEHICLE BOOTWELL AND DRAIN TROUGH APPARATUS

[75] Inventors: Brian W. Staley, Bloomfield; Bradley R. Garska, Ypsilanti, both of Mich.

[73] Assignee: ASC Incorporated, Southgate, Mich.

[21] Appl. No.: 09/241,723

[22] Filed: Feb. 2, 1999

[51] Int. Cl.[7] .......................................................... B60J 7/20
[52] U.S. Cl. .................................. 296/39.1; 296/107.08; 296/38
[58] Field of Search ............................. 296/37.16, 39.1, 296/39.2, 39.3, 107.01, 107.04, 107.07, 107.11, 124, 136, 195, 208, 213, 186, 97.23, 38, 194, 107.08

[56] References Cited

U.S. PATENT DOCUMENTS

| | | |
|---|---|---|
| 1,950,927 | 3/1934 | McMillan . |
| 2,382,635 | 8/1945 | Humer . |
| 2,649,330 | 8/1953 | Schamel et al. . |
| 2,664,309 | 12/1953 | Kavalar . |
| 2,772,114 | 11/1956 | Hennessy . |
| 3,096,117 | 7/1963 | Hallenbeck . |
| 3,143,373 | 8/1964 | Fordyce . |
| 3,154,341 | 10/1964 | Booth . |
| 3,170,726 | 2/1965 | Lystad . |
| 3,222,103 | 12/1965 | Wernig et al. . |
| 3,223,446 | 12/1965 | Coppock et al. . |
| 3,332,717 | 7/1967 | Amesbury et al. . |
| 3,510,165 | 5/1970 | Adams . |
| 3,630,568 | 12/1971 | Pedwya . |
| 3,954,537 | 5/1976 | Alfter et al. . |
| 4,512,606 | 4/1985 | Trostle et al. . |
| 4,516,803 | 5/1985 | Kaltz et al. . |
| 4,529,243 | 7/1985 | Kaltz et al. . |
| 4,537,440 | 8/1985 | Brockway et al. . |
| 4,712,828 | 12/1987 | Albrecht . |
| 4,930,833 | 6/1990 | Cichoski et al. . |
| 5,020,846 | 6/1991 | Bonnett . |
| 5,322,337 | 6/1994 | Rawlings et al. . |
| 5,395,152 | 3/1995 | Skornicka et al. . |
| 5,417,465 | 5/1995 | Koppenstein et al. . |
| 5,509,712 | 4/1996 | Rausch et al. . |
| 5,527,081 | 6/1996 | Rausch et al. . |
| 6,010,179 | 1/2000 | McGoldrick . |

OTHER PUBLICATIONS

1971 Fisher Body Service Manual, Section 12 "Folding Top", 1970, pp. 12–1 through 12–24.

1973 Car Shop Manual, "Part 46–04 Mustang and Cougar Convertible Top", Sep. 1972, pp. 46–04–01 through 46–04–05.

ASC Drawing No. W–39X0–4960–XXXX, Sheet 4F, 1990 Chrysler P–27 Convertible Top Cover Assembly (believed to have been offered for sale or publicly used prior to Feb. 2, 1999).

*Primary Examiner*—Dennis H. Pedder
*Assistant Examiner*—Patricia Engle
*Attorney, Agent, or Firm*—Harness, Dickey & Pierce, P.L.C.

[57] ABSTRACT

A preferred embodiment of an automotive vehicle apparatus includes a single piece bootwell and drain trough. In another aspect of the present invention, a bootwell, drain trough and drainage area are formed from plastic and have a generally rigid and freestanding construction. Yet another aspect of the present invention allows stowage of a convertible roof into the bootwell.

38 Claims, 6 Drawing Sheets

AUTOMOTIVE VEHICLE BOOTWELL AND DRAIN TROUGH APPARATUS

BACKGROUND AND SUMMARY OF THE INVENTION

The present invention relates generally to automotive vehicle apparatuses and more particularly to an automotive vehicle bootwell and drain trough apparatus.

It is generally known in the automotive industry to retract a convertible roof into a bootwell of a vehicle body. The bootwell is typically made from stamped sheet metal and is sometimes covered with a flexible cloth or vinyl liner. The traditional flexible liner is prone to snagging and tearing by the adjacent sharp sheet metal body. Furthermore, water leaks can develop at stitched seams of the liner.

A stamped sheet metal drain trough is commonly welded to an upper rear portion of the bootwell. The conventional drain trough acts to receive water rearwardly running off of the convertible roof. Separate, flexible drain hoses are often connected to the outboard ends of the drain trough for expelling the water. Examples of such constructions can be found in the following U.S. Pat. No. 2,772,114 entitled "Adjustable Attachment Means for a Motor Vehicle Fabric Top" which issued to Hennessy on Nov. 27, 1956; U.S. Pat. No. 3,096,117 entitled "Vehicle Body" which issued to Hallenbeck on Jul. 2, 1963; and U.S. Pat. No. 3,143,373 entitled "Drain Tube Assembly" which issued to Fordyce on Aug. 4, 1964. However, there is typically no adequate provision to handle any water overflowing from the metal drain trough into the bootwell. This can lead to water absorption of soft top roof fabric, bootwell liners, acoustic insulation or even the passenger compartment carpet. Also, traditional liners hold inadvertently overflowing water which can lead to unpleasant odors.

U.S. Pat. No. 5,509,712, entitled "Convertible Vehicle Topwell Assembly" which issued to Rausch et al. on Apr. 23, 1996, discloses a three piece plastic bootwell. However, this conventional device requires a complicated drain tube and grommet assembly which may lead to leaks, extra assembly expense and inadvertent pinching of the drain tubes during installation. Also, the drain channel arrangement necessitates a raised and convoluted floor, thereby encroaching on valuable roof storage space. It is also noteworthy that this patent, and the equivalent production part, do not disclose an integrated plastic drain trough; in production, the vehicle using this device has a separate metal drain trough welded to the vehicle body. In practice, the three piece liner appears to have been vacuum formed.

In accordance with the present invention, a preferred embodiment of the automotive vehicle apparatus includes a single piece bootwell and drain trough. In another aspect of the present invention, a bootwell, drain trough and drainage area are formed from plastic and have a generally rigid and freestanding construction. A further aspect of the present invention provides a rearmost portion of a roof located in a drain trough, wherein water can overflow into a bootwell for suitable drainage. Yet another aspect of the present invention allows stowage of a convertible roof into the bootwell.

The automotive vehicle bootwell and drain trough apparatus of the present invention are advantageous over traditional devices in that the present invention requires very little assembly and installation effort. Furthermore, the present invention also achieves seamless water flow paths between the drain trough, bootwell liner and the connected drainage areas. Another advantage of the present invention is that convertible roof storage space is maximized within the bootwell while still allowing access to bolts extending through underlying shock towers. The aesthetic appearance and convertible top-friendly surface of the present invention are also desirable. Additional advantages and features of the present invention will become apparent from the following description and appended claims, taken in conjunction with the accompanying drawings.

DETAILED DESCRIPTION OF THE PREFERRED EMBODIMENT

Figure 1:
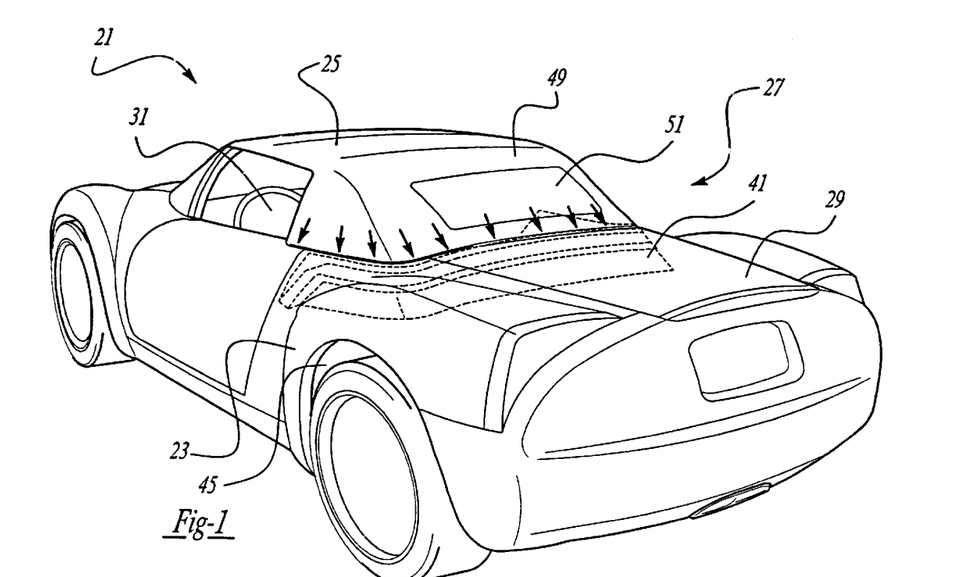
FIG. 1 is a perspective view showing an automotive vehicle employing the preferred embodiment of the bootwell and drain trough apparatus of the present invention.
Figure 2:
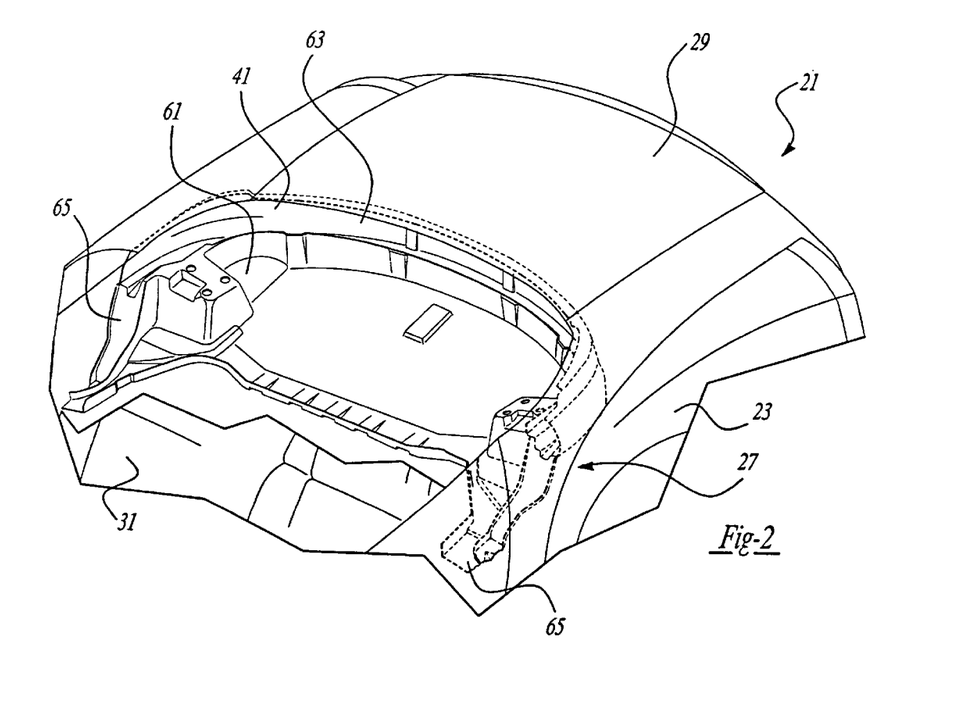
FIG. 2 is a partially fragmented perspective view, taken opposite that of FIG. 1, showing the automotive vehicle employing the preferred embodiment bootwell and drain trough apparatus.
Figure 3:
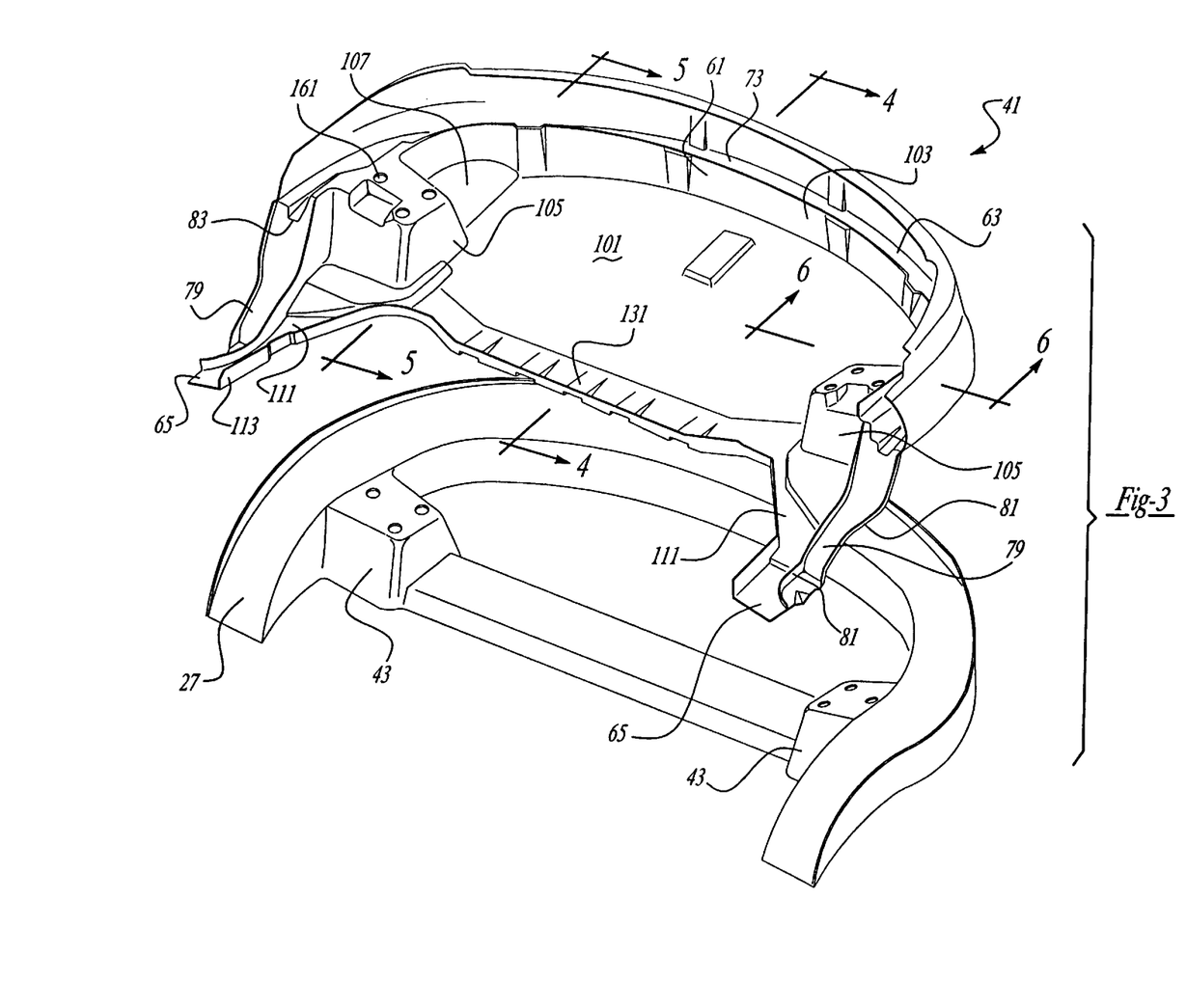
FIG. 3 is an exploded perspective view showing the bootwell portion of the automotive vehicle and the preferred embodiment bootwell and drain trough apparatus.

Referring to FIGS. 1–3, an automotive vehicle 21 has a body 23 and a convertible roof 25. A sheet metal bootwell 27 is disposed within body 23 forward of a trunk 29 and rearward of a passenger compartment 31 having seats. The preferred embodiment of an automotive vehicle bootwell and drain trough apparatus 41 of the present invention is located in bootwell 27 when in its installed position. Once installed, bootwell and drain trough apparatus 41 closely fits around a pair of shock towers 43 (see FIG. 6) and adjacent wheel houses 45 of body 23.

Convertible roof 25 is preferably of the type having five collapsible roof bows 47 (see FIG. 5) covered by a fabric top 49. A glass window or backlite 51 is attached to fabric top 49, however, a flexible backlite can be alternately used. Convertible roof can be constructed as is disclosed within U.S. Pat. No. 5,772,274 entitled "Motorized Drive System for a Convertible Roof of an Automotive Vehicle" which issued to Tokarz on Jun. 30, 1998, and U.S. Pat. No. 4,720,133 entitled "Convertible Top Structure" which issued to Alexander et al. on Jan. 19, 1988. Both of these patents are incorporated by reference herein. Alternately, convertible roof 25 can be of a hard top or combined hard and soft top variety such as is disclosed in U.S. Pat. No. 5,785,375 entitled "Retractable Hard-Top for an Automotive Vehicle" which issued to Alexander et al. on Jul. 28, 1998, which is incorporated by reference herein. Convertible roof 25 is movable from a passenger compartment covering position as shown in FIG. 1 to a fully retracted position completely stowed within bootwell and drain trough apparatus 41, as is partially shown in FIGS. 4–6.

FIGS. 3–7 illustrate the construction of the bootwell and drain trough apparatus 41. Bootwell and drain trough apparatus 41 has a storage compartment liner segment 61, a drain trough segment 63, a pair of drainage areas 65, a front trim panel 67 and a trim cap 69. Bootwell liner 61, drain trough 63 and drainage areas 65 are integrally injection molded as a single piece from high density polyethylene plastic. Injection molding is highly advantageous by forming a low piece cost part in a very quick and low labor operation. Also, part-to-part tolerance variations are optimized through injection molding. While there may be some die lock situations of apparatus 41 in the mold, apparatus 41 is flexible enough to allow removal of the part while remaining generally rigid enough to maintain its formed freestanding shape. Furthermore, this slight flexibility of apparatus 41 allows for some collapsing and bending of apparatus 41 during installation into bootwell 27 of vehicle 21 (see FIG. 2), such that a slight interference fit is created after installation. Alternately, however, apparatus 41 can be vacuumed formed if lower tooling cost is more important than the piece cost of the part.

Drain trough 63 has a generally C-shaped configuration as viewed from above and also has a somewhat C-shaped cross section. A generally vertical lip 71 upwardly projects from a bottom of drain trough 63 for defining a primary water flow path along a lower or bottom wall 73 of drain trough 63. Drain trough 63 runs in a crosscar direction rearward and above liner 61 and then turns forward and somewhat parallel to the quarter panels of the vehicle body. Drain trough 63 directly connects and is in fluid communication with a downwardly sloping bottom 79 of each drainage area 65 at the forward open ends of drain trough 63. A pair of upstanding walls 81 and the downwardly sloping bottom 79 of each drainage area 65 define the primary flow path of water from drain trough 63 to the fully depressed ends of drainage area 65. A slightly angled guide 83 further flows water from bottom 73 of drain trough 63 to each drainage area 65.

Figure 4:
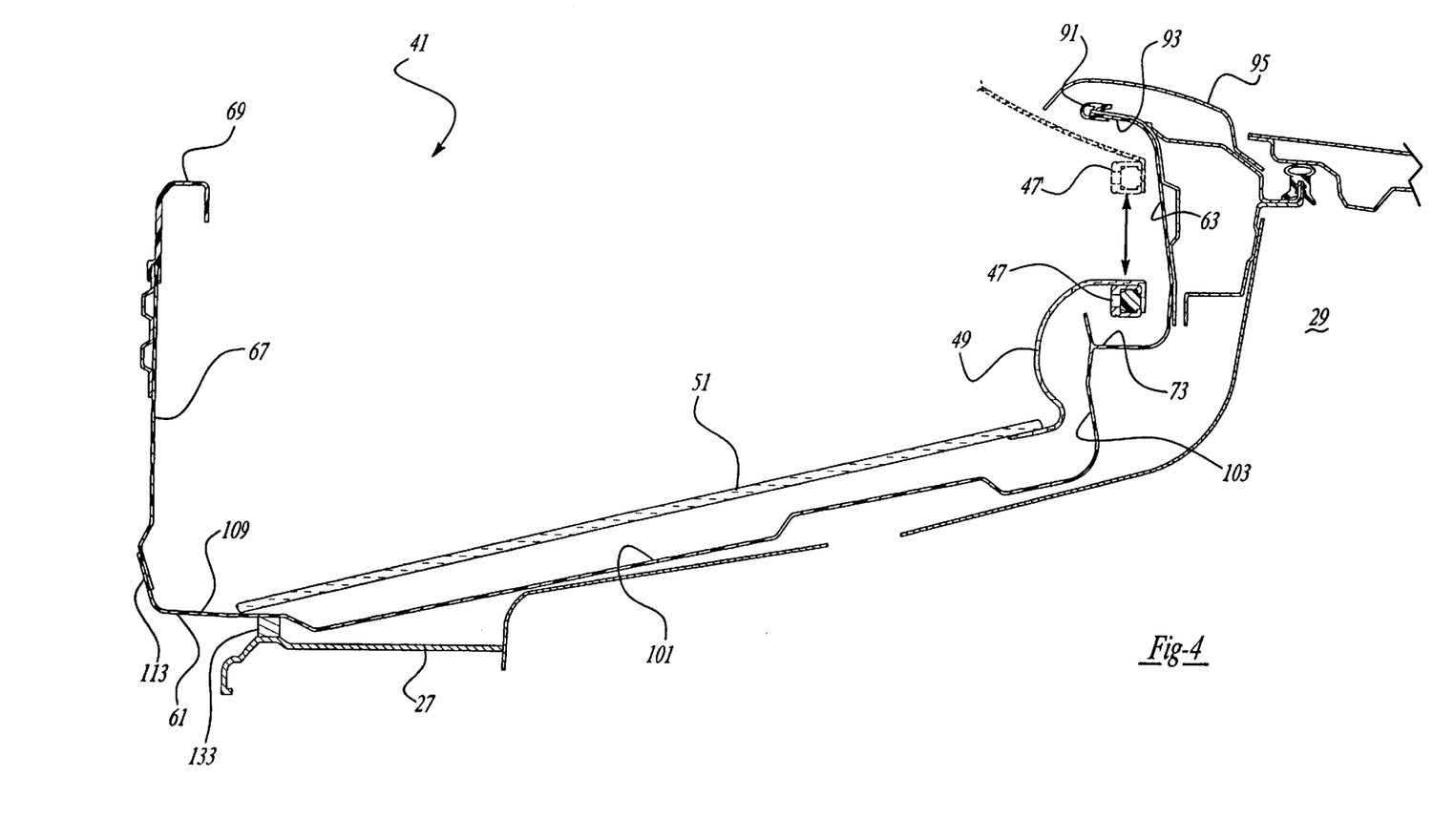
FIG. 4 is a cross sectional view, taken along line 4—4 of FIG. 3, showing the automotive vehicle employing the preferred embodiment bootwell and drain trough apparatus.

The water management ability of apparatus 41 is further enhanced by the positioning of a rearmost portion of convertible roof 25 (see FIG. 1) inside drain trough 63. Preferably, number five roof bow 47 is movable from a lower retracted position, near bottom 73 of drain trough 63, to a raised position 47' when convertible top 25 (see FIG. 1) is extended to its passenger compartment covering position. This encourages any water flowing from a rear portion of roof 25 to enter drain trough 63. Moreover, a weatherstrip 91 attaches the forward and slightly upwardly extending wall 93 of drain trough to a pinch weld flange of a crosscar metal box section of the body. A plastic garnish molding 95 is fastened to this box section thereby serving as an aesthetic cover and closeout panel.

Bootwell liner 61 has a primarily flat bottom 101 which has a forward tilt in order to serve as a secondary water runoff surface for water overflowing lip 71 of drain trough 63. A curved rear wall 103 integrally connects drain trough 63 to bottom 101 of liner 61. Upstanding side walls 105 of liner 61 closely surround and cover shock towers 43 and the wheel houses. A depressed area 107 is disposed behind each shock tower covering portion of liner 61 to allow for additional roof storage room and to further control the water flow patterns. A forward and generally flat portion 109 of liner 61 serves as a water collection and runoff area for the secondary water flow along bottom 101. Water collection area 109 is directly connected to and in fluid communication with a second downwardly sloping floor 111 of each drainage area 65. Water flow in this area is directed by the middle upstanding wall 81 and by an inboard upstanding wall 113.

Figure 7:
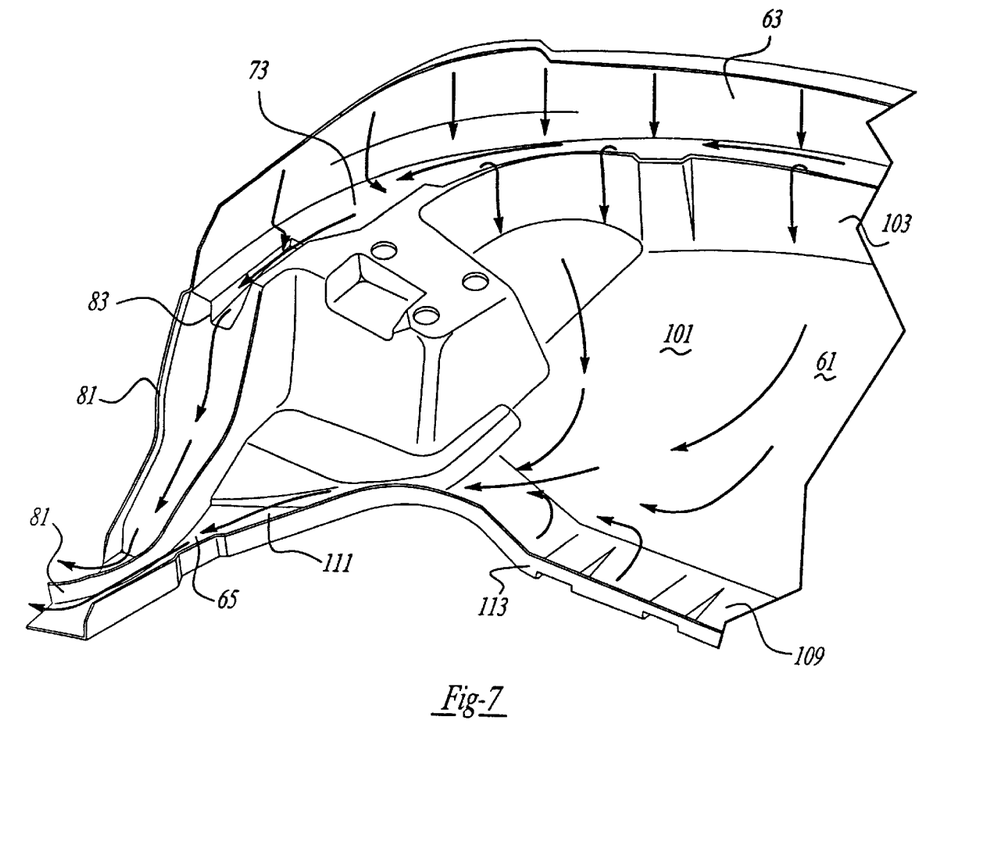
FIG. 7 is a fragmented perspective view showing the water flow paths of the preferred embodiment bootwell and drain trough apparatus.

Drainage areas 65 are openly accessible from above to encourage easy manufacturing and installation of apparatus 41. Inboard wall 113 of each drainage area 65 is formed to integrally and continuously connect to liner 61 adjacent collection area 109. When water flows from either or both drain trough 63 and liner 61 into each drainage area 65, the water will then drain into a hole in the adjacent rockers of the vehicle body. The water is then allowed to exit below the vehicle. Accordingly, no hoses or tubes need to be connected to the present invention bootwell and drain trough apparatus 41.

A series of corrugation-like gussets 131 are disposed within water collection area 109 of liner 61 to support a front edge of window 51; this allows for desirable and predictable folding and unfolding of the convertible roof. A set of foam spacers 133 support liner 61 off of the adjacent bootwell 27 in an attempt to prevent undesirable rattling.

Figure 5:
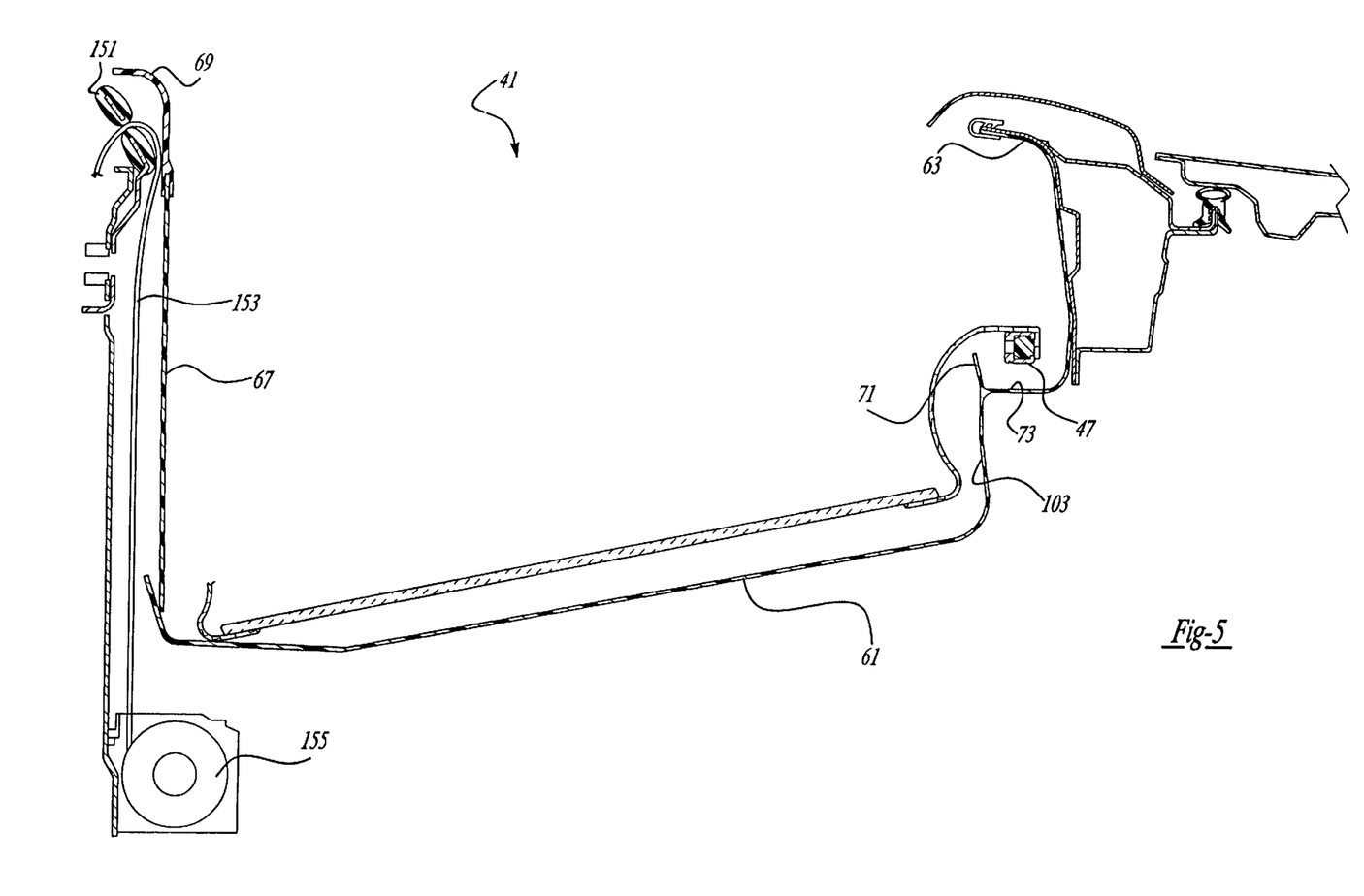
FIG. 5 is a cross sectional view, taken along line 5—5 of FIG. 3, showing the automotive vehicle employing the preferred embodiment bootwell and drain trough apparatus.

Trim panel 67 is a plastic part that is attached to inboard wall 113 of liner 61 by a slip fit and push pins, such as plastic Christmas tree fasteners (not shown). Plastic trim cap 69 is screwed to an upper edge of trim panel 67. Near its outboard ends, as shown in FIG. 5, cap 69 has a forwardly curved section which acts as a seatbelt retractor cover. More specifically, at these locations, cap 69 covers upper and rear portions of a D-ring or belt loop 151. A seatbelt 153 is attached to a seatbelt retractor 155 and extends through loop 151. It is alternately envisioned that trim panel 67 and/or seatbelt cover 69 can be integrally molded as part of liner 61 and/or drain trough 63.

Figure 6:
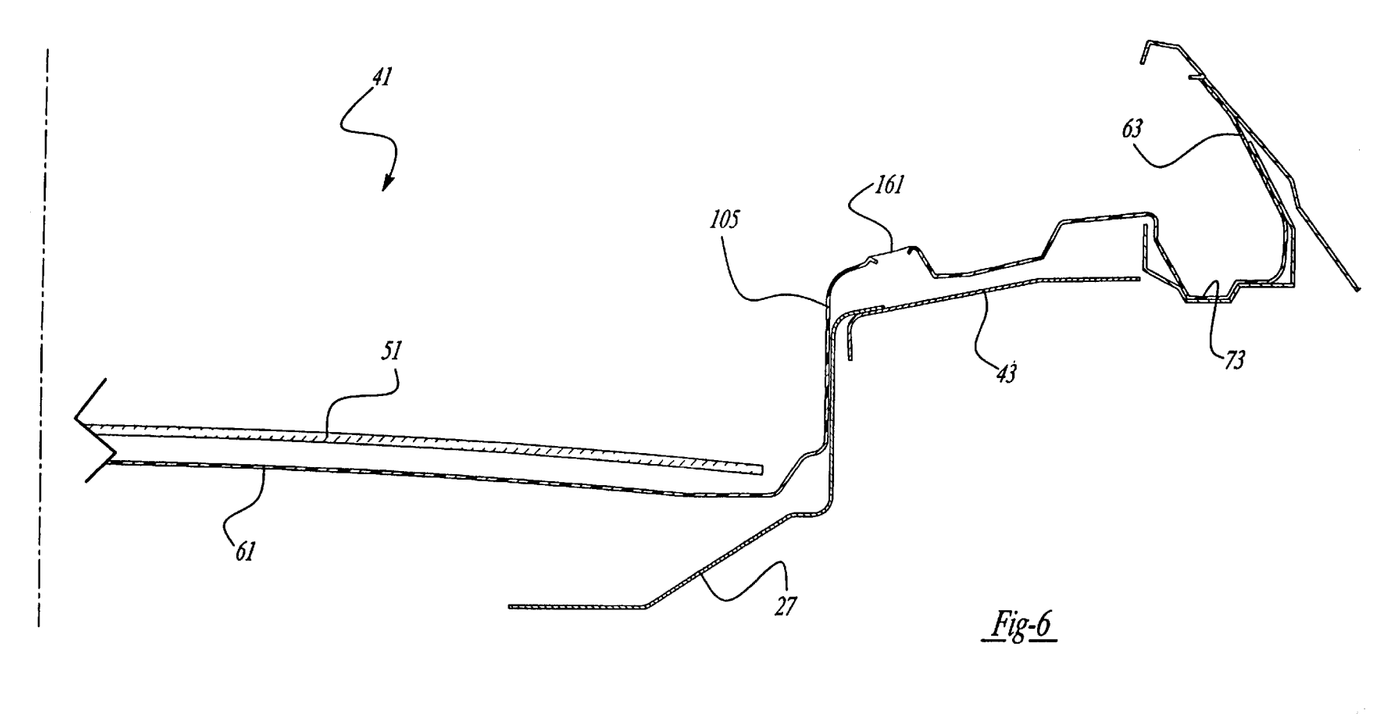
FIG. 6 is a cross sectional view, taken along line 6—6 of FIG. 3, showing the automotive vehicle employing the preferred embodiment bootwell and drain trough apparatus.

Moreover, three access holes 161 are disposed in each portion of liner 61 which covers shock towers 43. This is shown in FIGS. 3 and 6. These holes 161 allow screw driver or socket wrench access to bolts or nuts extending from shock towers 43. When holes 161 are not being accessed, plastic caps are inserted to close out these apertures.

While the preferred embodiment of the automotive vehicle bootwell and drain trough apparatus has been disclosed, it will be appreciated that other variations can be employed with the present invention. For example, the drain trough, liner and/or drainage areas may have different shapes. Furthermore, a plastic drain trough and/or plastic drainage areas can be separately formed from the liner and then sonically welded or heat-staked together before or during installation into the vehicle; however, these extra joints and seams are not as desirable as the integrally formed apparatus of the preferred embodiment. Other manufacturing processes can also be used to create the present invention apparatus. It is intended by the following claims to cover these and any other departures from the disclosed embodiments which fall within the true spirit of this invention.

The invention claimed is:

1. An automotive vehicle apparatus comprising:
   a storage compartment liner having a substantially rigid bottom and an upstanding side wall;
   a drain trough connected to the side wall and spaced away from the bottom;
   a drainage area connected and accessible to the liner and trough;
   wherein the liner, trough and drainage area are a single piece formed from plastic and are substantially rigid once formed; and
   a substantially vertical trim panel attached to a forward portion of the liner, the trim panel upwardly projecting from the bottom.

2. The apparatus of claim 1 wherein the trim panel is created separately from the liner, and the trim panel is formed from plastic.

3. The apparatus of claim 1 wherein the integrated liner, trough and drainage area are injection molded.

4. The apparatus of claim 1 wherein the integrated liner, trough and drainage area are vacuum formed.

5. The apparatus of claim 1 further comprising:
a storage compartment;
a shock towers protruding inside of the storage compartment; and
wheel housings protruding inside of the storage compartment;
the liner and trough fitting adjacent to portions of the shock towers and wheel housings, a depressed portion of the liner being located behind at least one of the shock towers.

6. The apparatus of claim 5 further comprising a trunk, wherein the storage compartment is located forward of the trunk and the liner has openings above the shock towers.

7. The apparatus of claim 1 further comprising a front wall of the liner, wherein the drainage area is open from above and has an upstanding section connecting to the front wall of the liner.

8. The apparatus of claim 1 further comprising a water collecting portion of the bottom having a tilt when installed and being substantially flat, the trough having a substantially C-shape when viewed from above.

9. An automotive vehicle apparatus comprising:
a storage compartment liner having a substantially rigid bottom and an upstanding side wall;
a drain trough connected to the side wall;
a first drainage area connected and accessible to the liner and trough;
wherein the liner, trough and drainage area are a single piece; and
a second drainage area connected to at least one of the liner and trough, wherein the drainage areas include depressions located adjacent crosscar ends of the drain trough.

10. The apparatus of claim 9 herein the depressions project forward of the liner.

11. An automotive vehicle apparatus comprising:
a storage compartment liner having a substantially rigid bottom and an upstanding side wall;
a drain trough connected to the side wall;
a drainage area connected and accessible to the liner and trough;
wherein the liner and trough are a single piece; and
a retractable convertible roof having a rear bow located in the trough, and a majority of the roof stowable above the bottom of the liner.

12. The apparatus of claim 11 wherein the liner and trough are free of drainage hoses.

13. The apparatus of claim 11 wherein the rear bow is vertically movable in the trough, and the trough includes an upper lip located above the rear bow.

14. An automotive vehicle apparatus comprising:
a roof storage compartment liner having a bottom and a side wall;
a drain trough attached to the liner, at least a majority of the bottom being sloped away from the trough; and
a drainage area connected to the liner and trough, the drainage area operably receiving water flowing from the liner and the trough, the liner and trough being free of drainage hoses;
the liner, trough and drainage area being formed from substantially rigid plastic.

15. The apparatus of claim 14 wherein the drainage area includes two depressions located adjacent crosscar ends of the drain trough.

16. The apparatus of claim 15 wherein the depressions project forward of the liner and the drainage area is open from above.

17. The apparatus of claim 14 further comprising a retractable convertible roof having a rear portion located in the trough, the roof being stowable above the bottom of the liner.

18. The apparatus of claim 17 further comprising a roof bow movable between upper and lower walls of the trough.

19. The apparatus of claim 14 further comprising a trunk and a convertible roof storage compartment, wherein the storage compartment is located forward of the trunk.

20. The apparatus of claim 14 wherein the integrated liner, trough and drainage area are injection molded as a single piece.

21. The apparatus of claim 14 wherein the integrated liner, trough and drainage area are vacuum formed as a single piece.

22. The apparatus of claim 14 further comprising a water collecting portion of the bottom having a tilt when installed and being substantially flat, the trough having a substantially C-shape when viewed from above.

23. The apparatus of claim 14 wherein the drainage area is molded as part of the liner and has an upstanding wall continuing at least to a centerline of the vehicle.

24. An automotive vehicle roof drainage system comprising:
a bottom wall having a substantially flat water collecting portion;
a first wall upwardly projecting from a front section of the bottom wall;
a curving second wall projecting upwardly from a rear section of the bottom wall;
a drain trough located substantially higher than the second wall; and
a roof having a rearmost portion located in the drain trough;
the drain trough being operable to receive water flowing from the rearmost portion of the roof and the bottom wall serving to receive any water overflowing the drain trough.

25. The system of claim 24 further comprising a first lip upwardly projecting from a floor of the drain trough.

26. The system of claim 25 further comprising a second lip extending in a forward direction from an upper portion of the drain trough, the drain trough having a substantially C cross sectional shape.

27. The system of claim 26 further comprising a weatherstrip mounted on the second lip.

28. The system of claim 24 wherein the roof is a convertible roof that is retractable to a stowed position above the bottom wall.

29. The system of claim 28 wherein the rearmost portion is a roof bow that is movable in the drain trough.

30. The system of claim 24 further comprising two depressions located adjacent crosscar ends of the drain trough serving to receive water flowing from the drain trough and the bottom wall.

31. The system of claim 30 wherein the depressions are integrally formed as part of the bottom wall.

32. The system of claim 30 wherein the depressions project forward of and are in fluid communication with the bottom wall and the drain trough.

33. The system of claim 24 further comprising a separately created and substantially vertical trim panel attaching to the first wall, the trim panel upwardly projecting from the bottom, wherein the bottom, first wall and second wall are all substantially rigid once formed.

34. The system of claim 24 wherein the bottom wall, second wall and drain trough are formed as a single plastic part.

35. An automotive vehicle apparatus comprising:
- a storage compartment liner having a substantially rigid bottom and an upstanding side wall, the liner being plastic;
- a plastic drain trough integrally connected to the side wall; and
- a seat belt cover mounted to the liner.

36. The system of claim 35 further comprising a separately created and substantially vertical trim panel attaching to a forward portion of the liner, the trim panel upwardly projecting from the bottom, the trim panel holding the cover to the liner.

37. The apparatus of claim 35 further comprising a retractable convertible roof having a rear bow located in the trough, and a majority of the roof stowable above the bottom of the liner.

38. The apparatus of claim 35 wherein the liner and trough are integrally formed a single piece, the trough is mounted to the liner substantially above and behind a majority of the bottom.

* * * * *

UNITED STATES PATENT AND TRADEMARK OFFICE
CERTIFICATE OF CORRECTION

PATENT NO.   : 6,145,909
DATED        : November 14, 2000
INVENTOR(S)  : Brian W. Staley and Bradley R. Garska Page 1 of 1

It is certified that error appears in the above-identified patent and that said Letters Patent is hereby corrected as shown below:

<u>Column 5,</u>
Line 7, delete "a".
Line 39, "herein" should be -- wherein --.

Column 8,
Line 11, after "formed" insert -- as --.

Signed and Sealed this

First Day of January, 2002

Attest:

JAMES E. ROGAN
*Attesting Officer*      *Director of the United States Patent and Trademark Office*